E. W. IVES.

Improvement in Axle-Boxes for Carriage-Wheels.

No. 5,063. Reissued Sep. 17, 1872.

Witnesses:
H. L. Wattenberg
John L. Brower

Inventor:
Eldridge W. Ives
per G. Mazzuchelli
Atty

AM. PHOTO-LITHOGRAPHIC CO. N.Y. (OSBORNE'S PROCESS.)

UNITED STATES PATENT OFFICE.

ELDRIDGE W. IVES, OF MOUNT CARMEL, CONNECTICUT, ASSIGNOR OF PART INTEREST TO DOTIUS D. IVES.

IMPROVEMENT IN AXLE-BOXES FOR CARRIAGE-WHEELS.

Specification forming part of Letters Patent No. 114,148, dated April 25, 1871; reissue No. 5,063, dated September 17, 1872.

*To all whom it may concern:*

Be it known that I, ELDRIDGE W. IVES, of Mount Carmel, in the county of New Haven and State of Connecticut, have invented a new and useful Improvement in Carriage-Axle Boxes; and that the following is a full, clear, and exact description of the same, reference being had to the accompanying drawing and to the letters of reference marked thereon making part of this specification.

The nature of my invention is an improvement in the construction of axle-boxes for carriages and other vehicles; and the invention consists in making such axle-boxes of rolled sheet metal or its equivalent, and forming and completing the same in dies, substantially as hereinafter described.

To enable others skilled in the art to make and use my invention, I will now proceed to describe its construction, referring to the accompanying drawing and to the letters marked thereon.

Figure 1:
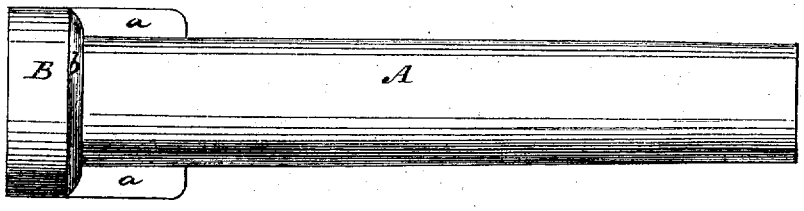
Figure 2:
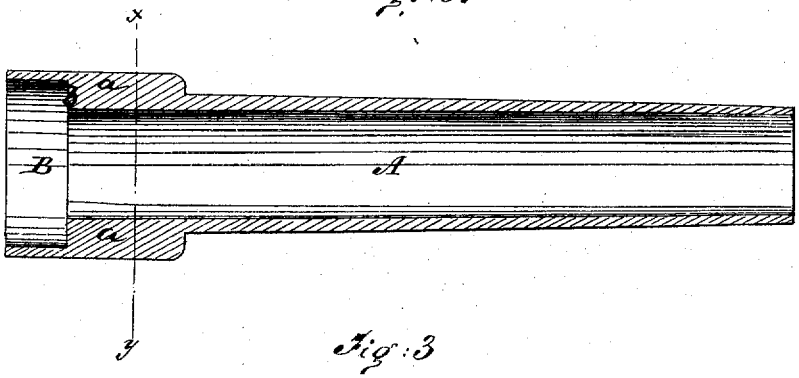
Figure 3:
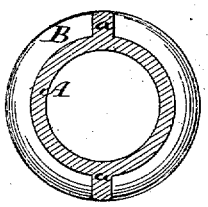

Figure 1 represents a side elevation of my box; Fig. 2 is a longitudinal section of the same; and Fig. 3 is a transverse section of the box taken on the line *x y*, Fig. 2.

In the construction of my axle-boxes A, I take a blank formed of rolled sheet metal or its equivalent, and put it in the dies, where it is shaped into the proper form. It is then taken to another press, where the collar B is formed upon the inner end. The edges of the metal blank are united, and, without further work, the box is ready for use.

The advantages of my box over a cast-iron box are that, as in making the cast-iron box, the box had first to be cast, then bored out, its outer surface turned, and then its ends cut squarely off, and as the metal which I use is rolled sheet metal or its equivalent, and as the dies stamp the blank forms into proper shape, the casting, boring, turning, and shaping the ends are all dispensed with, and I produce an article which is not only far cheaper but lighter and neater than those which are cast.

Having thus described my invention, what I claim as new, and desire to secure by Letters Patent, is—

An axle-box, formed complete in dies from a single piece of rolled sheet metal or its equivalent, substantially as described, as a new article of manufacture.

ELDRIDGE W. IVES.

Witnesses:

EMILY SANFORD,

LEVERETT HITCHCOCK.